(12) United States Patent
Lee

(10) Patent No.: US 6,507,366 B1
(45) Date of Patent: Jan. 14, 2003

(54) METHOD AND APPARATUS FOR AUTOMATICALLY TRACKING A MOVING OBJECT

(75) Inventor: Hee-Jong Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/062,556

(22) Filed: Apr. 20, 1998

(51) Int. Cl.[7] .................. H04N 5/232; H04N 5/225; G03B 13/00; G06K 9/00
(52) U.S. Cl. .................. 348/352; 348/352; 348/358; 348/170; 348/211; 348/169; 382/103
(58) Field of Search ................. 348/170, 358, 348/103, 345, 349, 211, 169, 352

(56) References Cited

U.S. PATENT DOCUMENTS

| | | | | |
|---|---|---|---|---|
| 4,543,609 A | * | 9/1985 | Smith | 358/210 |
| 5,061,952 A | * | 10/1991 | Ogawa | 354/400 |
| 5,231,483 A | * | 7/1993 | Sieber et al. | 358/125 |
| 5,323,470 A | * | 6/1994 | Kara et al. | 382/1 |
| 5,355,163 A | * | 10/1994 | Tomitaka | 348/234 |
| 5,434,621 A | * | 7/1995 | Yu | 348/345 |
| 5,467,127 A | * | 11/1995 | Jong-Pil | 348/169 |
| 5,473,368 A | * | 12/1995 | Hart | 348/169 |
| 5,479,203 A | * | 12/1995 | Kawai et al | 348/358 |
| 5,598,209 A | * | 1/1997 | Cortjens et al. | 348/211 |
| 5,631,697 A | * | 5/1997 | Nishimura et al. | 348/170 |
| 5,714,999 A | * | 2/1998 | Jeong et al. | 348/169 |
| 5,870,141 A | * | 2/1999 | Matsumura et al. | 348/169 |
| 5,963,248 A | * | 10/1999 | Ohkawa et al. | 348/169 |
| 6,072,525 A | * | 6/2000 | Kaneda | 348/169 |
| 6,075,557 A | * | 6/2000 | Holliman et al. | 348/169 |
| 6,079,862 A | * | 6/2000 | Kawashima et al. | 349/169 |

FOREIGN PATENT DOCUMENTS

JP          406160944 A    *   6/1994   ............ G03B/15/00

* cited by examiner

*Primary Examiner*—Wendy R. Garber
*Assistant Examiner*—John M. Villecco
(74) *Attorney, Agent, or Firm*—Sughrue Mion, PLLC

(57) ABSTRACT

An apparatus and method for automatically tracking an object is provided. The apparatus for performing the method includes a camera having a zoom lens, an automatic focus lens, and a charge coupled device for converting an image of an object input via the lens into electrical signals. The camera is mounted on a camera supporter to rotate the camera around a first axis and the axis perpendicular to the first axis. The supporter includes holes and sensors for detecting the rotational limit of the camera in the horizontal and vertical directions. A pan/tilt controller detects a motion vector of the object, and controls the camera to move in the direction and degree corresponding to the detected motion vector. A zoom focus controller performs a zooming operation to expand an object search region of the camera whenever the camera reaches the limit of the rotational range in at least one direction, and adjusts an automatic focusing lens. A system controller connected to the pan/tilt controller and zoom/focus controller initializes a camera in order to automatically track a moving object and controls the operations sequence of each functional block.

10 Claims, 7 Drawing Sheets

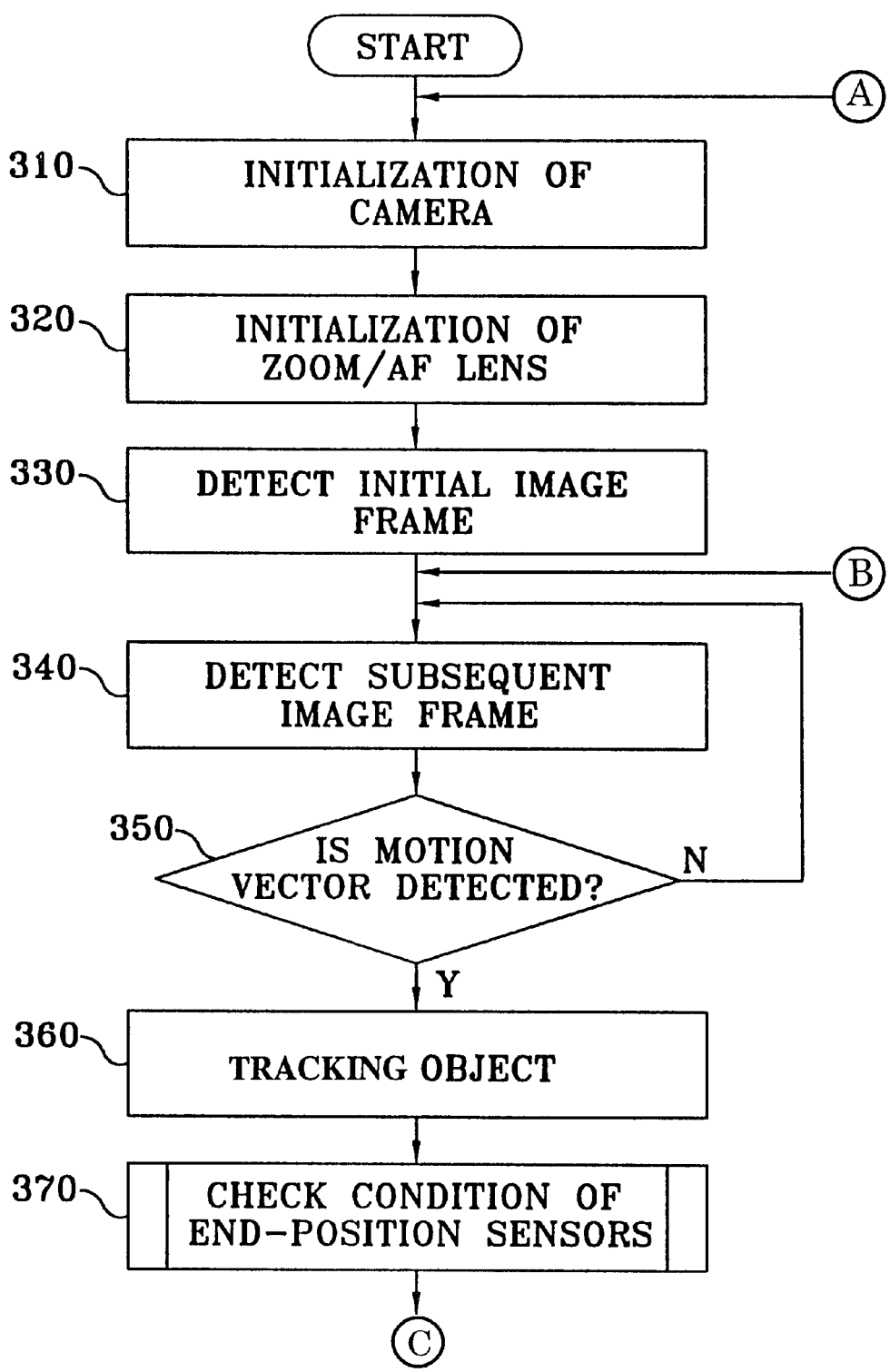

METHOD AND APPARATUS FOR AUTOMATICALLY TRACKING A MOVING OBJECT

BACKGROUND OF THE INVENTION

The present invention relates to an apparatus and method for automatically tracking a moving object, so that the object is always positioned in front of the lens of a camera by controlling the camera.

In a general video conferencing system, a video telephone and a monitoring system, a camera picks up an image of an object which is transformed as a video signal. The picked-up video signal is transmitted or stored in a recording medium. As each of the above systems were introduced, the camera was fixed to the main body of each system. Thus, when an object was not positioned in front of the camera due to its movement, a user manually adjusted the position of the system body itself or the camera itself, in order to direct the camera toward the object so that the latter was positioned in front of the camera lens allowing its image to be picked up.

However, when a user moves during dialog in the video conferencing system or video telephone, the above manual repositioning of the camera causes the user to be conscious of the camera. The user must also directly adjust the camera while watching the monitor, which causes inconvenience during use of the systems.

To solve these problems, a conventional apparatus includes a camera driving device for rotating a camera in a horizontal or vertical direction, and a motion detector for detecting a motion of the object. The camera automatically rotates in the direction of the detected motion. The degree of rotation also corresponds to the degree of detected motion. The camera driving device includes two motors for rotating the camera in a horizontal or vertical direction. The motion detector detects a motion vector of the object from sequential unit images obtained by a picture tube, using a well-known block matching algorithm (BMA). The apparatus generates motor drive signals having the direction and magnitude which correspond to the detected motion vector of the object, and controls the camera so that the object is positioned in front of the camera lens. Thus, the method for automatically adjusting the camera according to the movement of the object reduces the inconvenience of using the video conferencing and telephone systems.

However, in the above automatic method, the camera cannot track the object when the object is beyond the range in which the camera can be rotated in a horizontal or vertical direction.

SUMMARY OF THE INVENTION

To solve the above problems, it is an object of the present invention to provide a method for expanding an object search region of a camera using a zooming operation. A conventional automatic camera control method is performed when the camera is within a camera rotation range, and a zooming operation is performed to adjust the object search region when the object is beyond the camera's rotational range.

It is another object of the present invention to provide an apparatus embodying the above method.

To accomplish the above object of the present invention, there is provided a method for automatically tracking a moving object by controlling a camera, the automatic object tracking method comprising the steps of: (a) comparing sequential unit images with each other, detecting a motion vector of the object, generating camera control signals corresponding to the detected motion vector, and controlling the camera to track the moving object; (b) checking whether the camera reaches the limit of rotation range of the camera; and (c) performing a zooming operation in the direction of expanding an object search region of the camera until the object is positioned within a predetermined effective region whenever it is determined that the camera reaches the limit of the rotation range of the camera.

To accomplish another object of the present invention, there is also provided an apparatus for automatically tracking a moving object, the automatic tracking apparatus comprising:

a camera including a zoom lens and an automatic focus lens, for converting an image of the object input through the lenses into an electrical signal; a camera support unit including a camera driver on which the camera is mounted, for rotating the camera around a first axis and a second axis perpendicular to the first axis and a rotation limit detector for detecting whether the camera reaches one of the limits of the rotation range of each direction and outputting a detection signal if the camera reaches a limit of the rotation range; a first controller for comparing a current unit image output from the camera with a previous unit image, detecting a motion vector of the object, and controlling the camera drive means so that the camera moves in the direction and degree in correspondence to the motion vector; and a second controller for adjusting the zoom lens in the direction of expanding an object search region of the camera whenever a detection signal, indicating that the camera has reached a limit of the rotation range, is activated, thereby allowing the camera to track the moving object, and adjusting an automatic focusing lens using a luminance component of the image received in the camera.

BRIEF DESCRIPTION OF THE DRAWINGS

The preferred embodiments are described with reference to the drawings, wherein

FIGS. 3A, 3B and 3C are flow-chart diagrams for explaining the operation of the apparatus shown in FIG. 1;

DETAILED DESCRIPTION OF THE PREFERRED EMBODIMENTS

Preferred embodiments of the present invention will be described in detail with reference to the accompanying drawings FIGS. 1 through 6.

Figure 1:
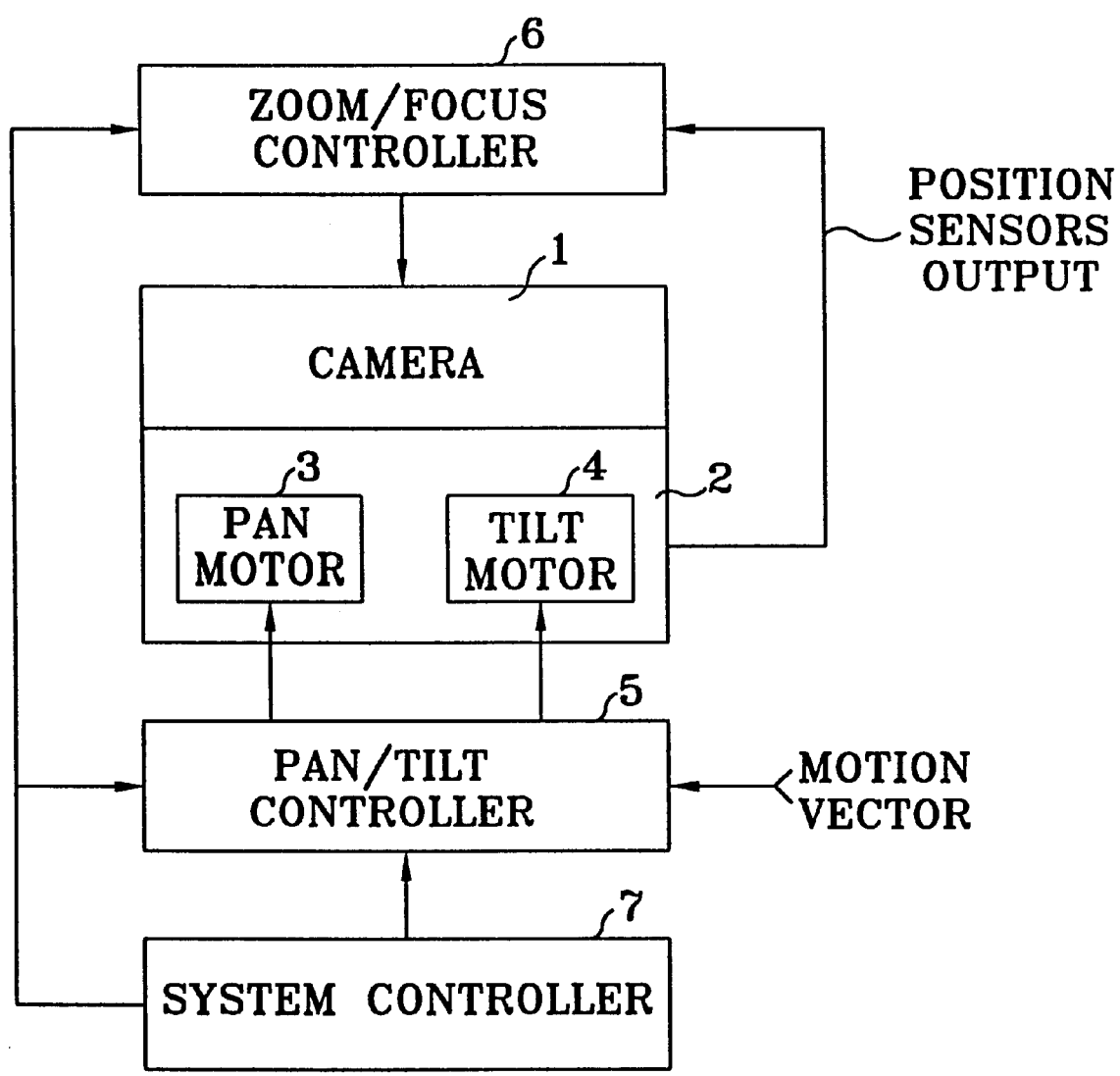
FIG. 1 is a block diagram showing an automatic tracking camera apparatus for automatically tracking a moving object according to a preferred embodiment of the present invention.

FIG. 1 shows a block diagram of an automatic tracking camera apparatus for automatically tracking a moving object according to a preferred embodiment of the present invention. The apparatus includes a camera 1 for capturing an image of the object and converting the image into electrical signals. The camera 1 includes a lens unit having a zoom lens (not shown) and an automatic focus (AF) lens (not shown), and a charge coupled device (CCD) (not shown) for converting optical image signals input via the lenses into electrical signals. A camera supporter 2 on which the camera 1 is mounted includes a pan motor 3 for rotating the camera 1 in the horizontal direction and a tilt motor 4 for rotating the camera 1 in the vertical direction.

A pan/tilt controller 5 which is connected to the pan motor 3 and the tilt motor 4 controls driving of the pan motor 3 and the tilt motor 4 in correspondence to movement of the object. For this purpose, the pan/tilt controller 5 obtains a motion vector of the object, and calculates an angle for the camera 1 to be rotated in the horizontal and vertical directions, using the obtained motion vector. Then, the pan/tilt controller 5 generates motor drive pulse signals, corresponding to the direction and size of the motion vector, to move the camera 1. These generated motor drive pulse signals are output to the pan motor 3 and the tilt motor 4. As a result, the pan motor 3 rotates the camera 1 in the horizontal direction, that is, in the left or right direction with respect to the front of the lens of the camera 1. At the same time, the tilt motor 4 moves the camera 1 in the vertical direction, that is, in the up or down direction with respect to the front of the lens of the camera 1.

Figure 2A:
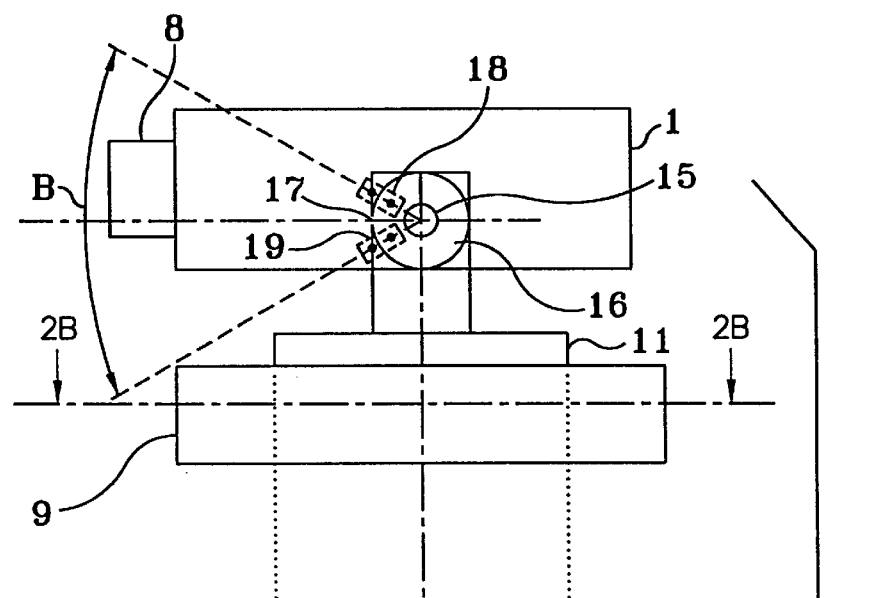
FIG. 2A is a side view of the automatic tracking camera apparatus shown in FIG. 1.
Figure 2B:
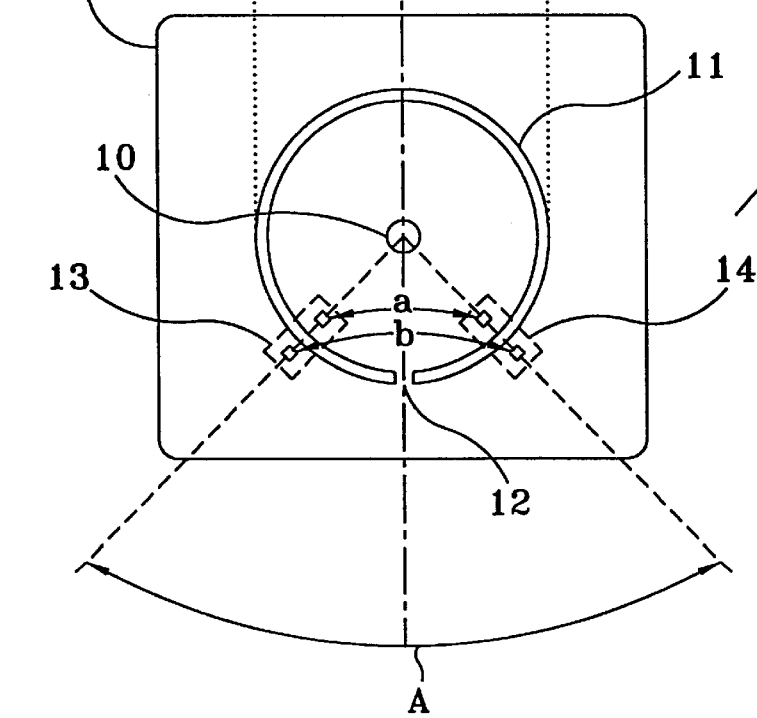
FIG. 2B is a sectional view of the automatic tracking camera apparatus of FIG. 2A along the line 2B—2B.

Meanwhile, the zoom/focus controller 6 shown in FIG. 1 performs a zooming operation such as a zoom-in or zoom-out operation by adjusting a zoom lens of the camera 1 according to output signals of end-position sensors 13, 14, 18 and 19 shown in FIGS. 2A and 2B. These sensors are installed in the camera supporter 2. Here, the end-position sensors 13, 14, 18 and 19.detect the limit of the rotation range between which the camera 1 can rotate in the left or right (horizontal) direction or in the up or down (vertical) direction. When the zooming operation completes, the zoom focus/controller 6 adjusts an AF lens of the camera 1 to automatically focus at a focal point, using a luminance component of the image input to the camera 1.

Also, the FIG. 1 apparatus includes a system controller 7 connected to the pan/tilt controller 5 and the zoom/focus controller 6. The system controller 7 initializes the FIG. 1 apparatus and generally controls the operational sequence of the respective functional blocks.

FIGS. 2A and 2B show the mechanical structure of the FIG. 1 apparatus. The camera 1 includes a lens unit 8 and can rotate around a first arbitrary axis and simultaneously rotate around a second axis perpendicular to the first axis. The camera supporter 2 enables the rotational movement of the camera 1. The camera supporter 2 includes a mount base 9 and a pan motion carrier 11 mounted on the mount base 9 and connected to the pan motor 3 shown in FIG. 1 via a pan shaft 10. Here, the pan motion carrier 11 rotates the camera 1 in the horizontal direction within the range of an angle "A" according to the rotation of the pan motor 3. Also, a tilt motion carrier 15 is connected to the tilt motor 4 via a tilt shaft 16, and is mounted on the upper portion of the pan motion carrier 11. Here, the tilt motion carrier 15 rotates the camera 1 within the range of an angle "B" in the direction perpendicular to the rotational direction of the pan motion carrier 11.

Also, the camera supporter 2 of the FIG. 2 apparatus includes holes 12 and 17 and sensors 13, 14, 18 and 19 for detecting the rotational range of the camera 1 in the left or right (horizontal) direction or in the up or down (vertical) direction.

First, the hole 12 provided in the pan motion carrier 11 is used for detecting the rotational limit of the camera 1 in the horizontal direction together with two pairs of position sensors 13 and 14. Here, the hole 12 rotates along with the rotation of the pan motion carrier 11. Also, each position sensor includes a light emission portion "a" disposed on the inner side of the pan motion carrier 11 for generating light, and a light receiving portion "b" disposed on the outer side of the pan motion carrier 11, for sensing light generated by the light emission portion "a". The position sensors are fixed to the base corresponding to the left end and the right end of the angle A. Thus, when the hole 12 reaches the left end or right end of the angle A according to the rotation of the pan motion carrier 11, the position sensors 13 and 14 and the hole 12 lie in a straight line. At the same time, the light coming from the light emission portion "a" passes through the hole 12 and is detected in the light receiving portion "b". Here, the light receiving portion "b" outputs a detection signal indicating that the camera 1 has reached a rotational limit position. By this principle, a pan left-end (PLE) sensor 13 shown in FIG. 2B detects the left-rotational limit of the camera 1 and a pan right-end (PRE) sensor 14 detects the right-rotational limit.

Also, the hole 17 provided in the tilt motion carrier 15 is used for detecting the rotational limit of the camera 1 in the vertical direction together with two pairs of position sensors 18 and 19. Here, the two pairs of position sensors 18 and 19 have the same structure and function as those of the above-described sensors 13 and 14. The position sensors are a tilt upper-end (TUE) sensor 18 for sensing the upper rotational limit and a tilt lower-end (TLE) sensor 19 for sensing the lower rotational limit, which are fixed to the respective positions corresponding to the upper rotational limit and the lower rotational limit of the angle B. The method for detecting the vertical rotational limit of the camera 1 using the two pairs of position sensors 18 and 19 and the hole 17 is the same as that for detecting the horizontal rotational limit of the camera 1.

Figure 3B:
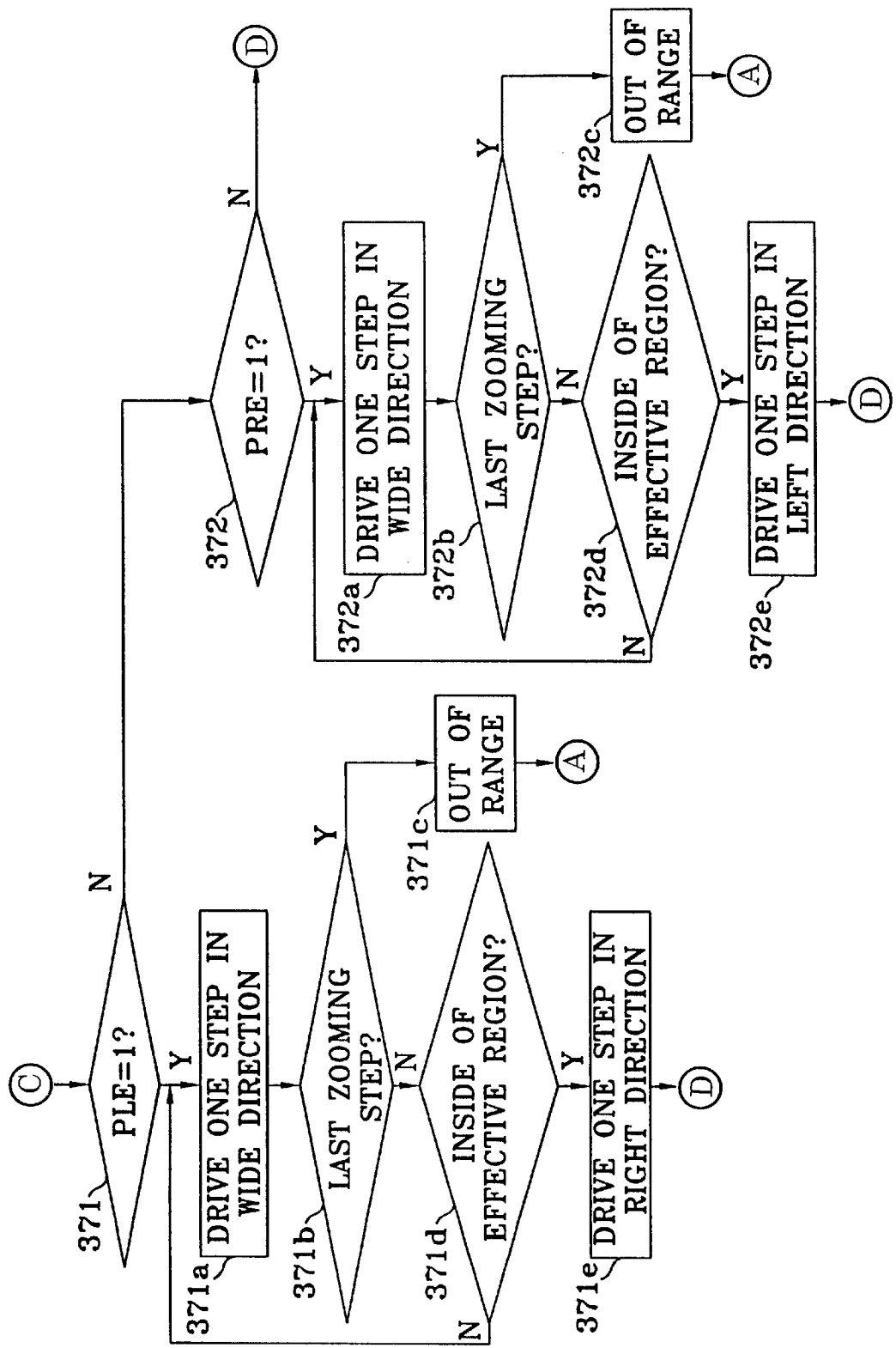
Figure 3C:
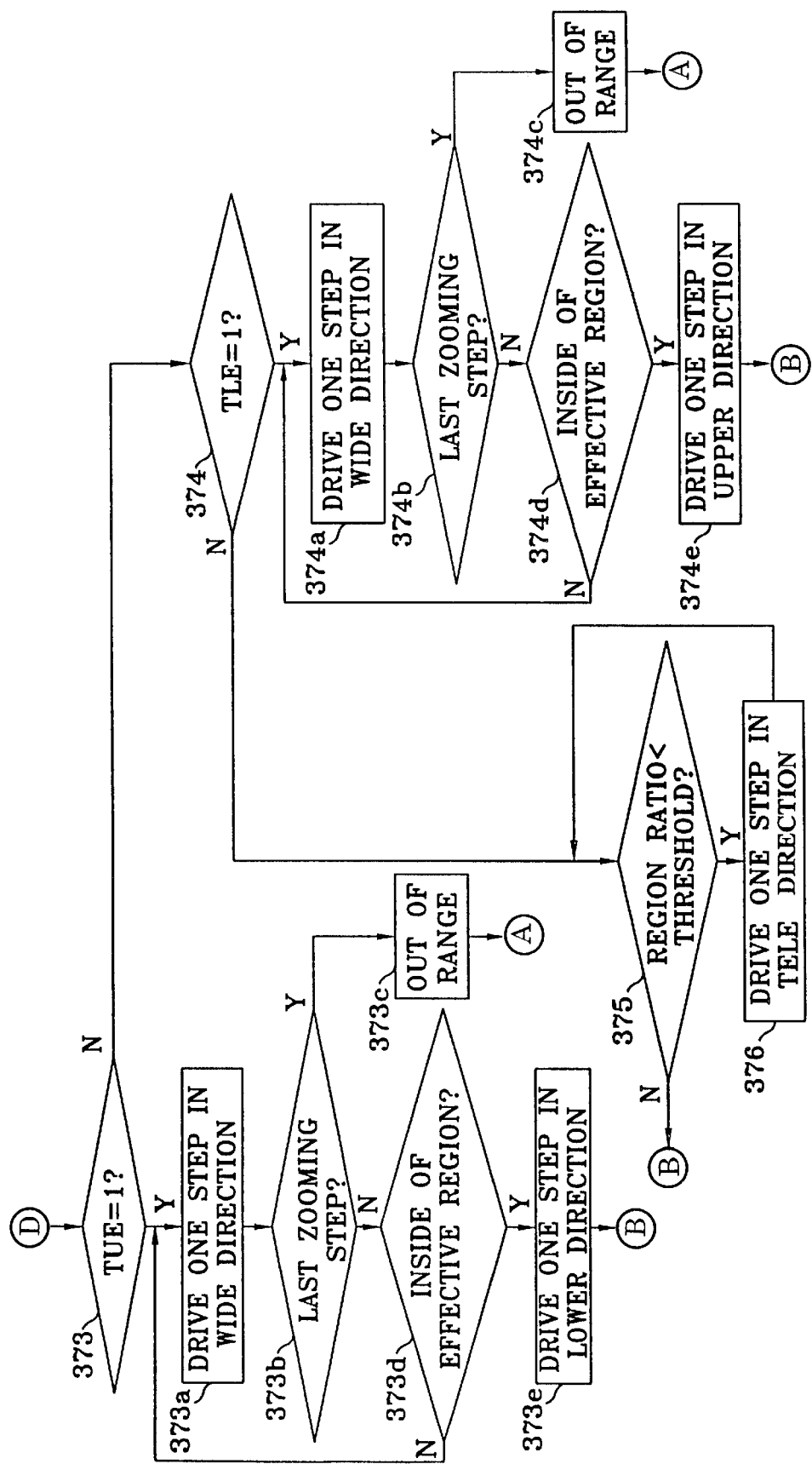

FIGS. 3A, 3B and 3C are flow-chart diagrams for explaining the operation of the apparatus shown in FIG. 1. In the whole operational flow-chart referring to FIGS. 3A, 3B and 3C, steps 310 through 360 are a main routine of a program embodying the present invention and steps 370 through 376 corresponds to a subroutine of the step 360. The above first steps 310–330 initialize an apparatus for automatically tracking a moving object, steps 340–350. detect a motion vector of the object, and step 360 makes the camera 1 move in the direction and degree in correspondence to the detected motion vector in order to track the object. The steps 371a, 372a, 373a, and 374a adjust a zoom lens so that a search region of the object is expanded to a predetermined effective region whenever the object is beyond the rotational limit of the camera 1 using the tracking procedure of steps 330–370. By expanding the effective region for tracking, automatic tracking of the object can continue even if the camera has reached one of its rotational limits.

Referring to FIG. 3A, the system controller 7 applies an initialization command to the pan/tilt controller 5 and the zoom/focus controller 6, in order to initialize the apparatus for automatically tracking the moving object. The pan/tilt controller 5, which receives the initialization command from the system controller 7, adjusts a horizontal angle and a vertical angle of the pan motion carrier 11 and the tilt motion carrier 15 to zero relative to a reference point, and controls the lens unit 8 of the camera 1 to be directed towards the front center (step 310). The zoom/focus controller 6, which receives the initialization command from the system controller 7, initializes the zoom lens and the AF lens so that the camera 1 has the minimum focal distance (step 320).

When the initialization step is completed, the system controller 7 controls the camera 1 to detect an initial image frame of the object (step 330), and then to detect a subsequent image frame of the object (step 340). When the two sequential image frames of the object have been detected, the pan/tilt controller 5 obtains a motion vector corresponding to a difference between the two sequential image frames under the control of the system controller 7. Here, the motion vector can be obtained by a separate video processor (not shown), rather than the pan/tilt controller 5.

A general image signal handled in the video telephone and the video conferencing system is composed of many background images which are relatively still. A movement of the object is rather small in the image. As described above, in the case where the movement of the object image is relatively small, the relationship between the two sequential unit images has a relatively large correlation. A well-known block matching algorithm (BMA) is used as the method for obtaining a motion vector of the object in a particular unit image signal. The BMA divides the image signal of a display unit screen into magnitude blocks of a predetermined unit, and finds a block which is the most similar to a current block to be encoded from the previously input image signal of the display unit screen. The BMA is disclosed in detail in U.S. Pat. No. 5,173,772 to Choi and assigned to Samsung Electronics Co., Ltd. The present invention uses the BMA to calculate a motion vector of the object.

Meanwhile, when the motion vector of the object is calculated, the pan/tilt controller 5 analyzes the calculated motion vector and judges whether or not the object moves (step 350). In the step for judging object movement, if the calculated motion vector has a magnitude of a predetermined value or more, the pan/tilt controller 5 judges that the object has moved. If the calculated motion vector has a magnitude less than a predetermined value the pan/tilt controller 5 judges that the object hasn't moved. If it is judged that there is no movement of the object, the program returns to step 340, and repeatedly performs steps 340 through 350 until a movement of the object is detected.

If it is judged that there is a movement of the object, the pan/tilt controller 5 generates motor drive signals corresponding to the motion vector and controls the camera 1 to track the moving object (step 360). The pan/tilt controller 5 calculates a distance by which the camera 1 should move using the motion vector in order to move the camera 1 a distance corresponding to the distance that the object moved. Here, the distance that the camera 1 should move is proportional to the motion vector. Subsequently, the pan/tilt controller 5 generates motor drive signals corresponding to the calculated moving distance for the camera 1, and outputs the motor drive signals to the pan motor 3 and the tilt motor 4. Here, the pan/tilt controller 5 can supply a particular rotational direction control signal to control a rotational direction of each motor corresponding to a motion vector of the object, or can control a rotational direction of each motor using the motor drive signal. The pan motor 3 and the tilt motor 4 both receive the motor drive signals and rotate in the direction and degree corresponding to a motion vector of the object according to the supplied control signals. Then, the pan motion carrier 11 and the tilt motion carrier 15, which rotate according to rotation of each motor, rotate the camera 1 in the horizontal and vertical directions, in order to reposition the camera to compensate for the movement of the object. Thus, it is possible for the camera 1 to track the moving object.

Figure 4:
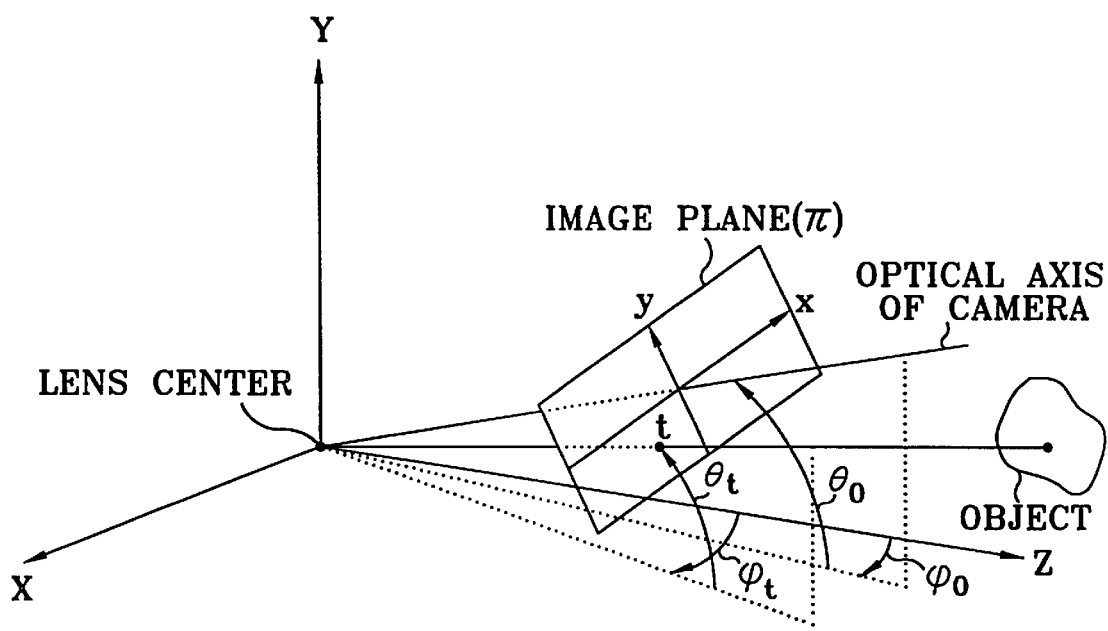
FIG. 4 is a conceptual view for explaining a process for obtaining a displacement of the camera from the position component of the moving object on the image plane $\pi$.

FIG. 4 is a conceptual view for explaining a process for producing a displacement of the camera 1 based on the position component of the moving object on the image plane π. First, the movement of the object on the image plane can be represented by the movement to the x-direction or y-direction on the image plane π shown in FIG. 4. Thus, the position of the object is t on the image plane π, the distance component of the object is represented by $(x_t, y_t)$ and is converted into an angular component $(\psi_t, \theta_t)$. This conversion is performed by the following known equations. (A video tracking system with adaptive predictors, Pattern recognition, Vol. 25, 1171–1180, 1992, by Chen and Chang):

$$\psi_t \approx \psi_0 + \frac{x_t}{f\cos\theta_0}, \quad \theta_t \approx \theta_0 + \frac{y_t}{f}.$$

Here, f denotes a focal distance of the camera, $(\psi_0, \theta_0)$ denotes a $(\psi, \theta)$ component of an initial optical axis of the camera.

Meanwhile, using the calculated $(\psi_t, \theta_t)$, a displacement $(\Delta\psi, \Delta\theta)$ is calculated by the following equations:

$$\Delta\psi \approx \psi_t - \psi_0 \approx \frac{x_t}{f\cos\theta_0}, \quad \Delta\theta \approx \theta_t - \theta_0 \approx \frac{y_t}{f}$$

Here, f can be obtained from a process of focusing an image of the object by the camera lens. The pan/tilt controller 5 generates a vertical and horizontal motor drive signals in correspondence to the displacement and rotates the camera 1 in order to control the camera 1 to track the object.

When the camera 1 tracks the movement of the object in step 360, the zoom/focus controller 6 checks the states of the limit position sensors such as the PLE sensor 13, the PRE sensor 14, the TUE sensor 18 and the TLE sensor 19 (step 370). When the camera 1 tracks the object in step 360, the zoom/focus controller 6 detects whether the object is beyond the limit of the rotational range in the horizontal and vertical directions.

Meanwhile, referring to FIG. 3B, the zoom/focus controller 6 checks whether the PLE sensor 13 installed at the left-hand rotational limit position of the pan motion carrier 11 operates (step 371). In other words, if the camera tracks the object and reaches the left-hand rotational limit position, the hole 12 of the pan motion carrier 11 and the light emitting and light detecting components of the PLE sensor 13 lie in a straight line, so that the output value of the sensor becomes "1". In step 371, if the output value of the sensor is "1", the pan/tilt controller 5 cannot track the movement of the object any more with the camera in its present state. In this case, the zoom/focus controller 6 controls the zoom lens provided in the camera 1 by one step in the wide direction to thereby expand the object search region of the camera (step 371a). If the zoom lens is adjusted in the wide direction, the apparent size of the object is reduced and the object search region of the camera is expanded. The object search region of the camera can be expanded to an adjustment limit in the wide direction of the zoom lens.

Meanwhile, when the step 371a is completed, the zoom/focus controller 6 judges whether the camera has reached the last zooming step (step 371b) in the wide angle or telephoto direction. The last zooming step corresponds to a zooming limit based on the characteristics of the zoom lens, where no zooming operation can be performed in the direction of expanding or reducing the object search region of the camera. If it is judged that no more zooming can be performed while the object is not included in the effective region (to be described below), the zoom/focus controller 6 recognizes that the object is beyond the tracking range of the zooming operation, and controls the process to return to step 310 of the initial state (step 371c).

Figure 5:
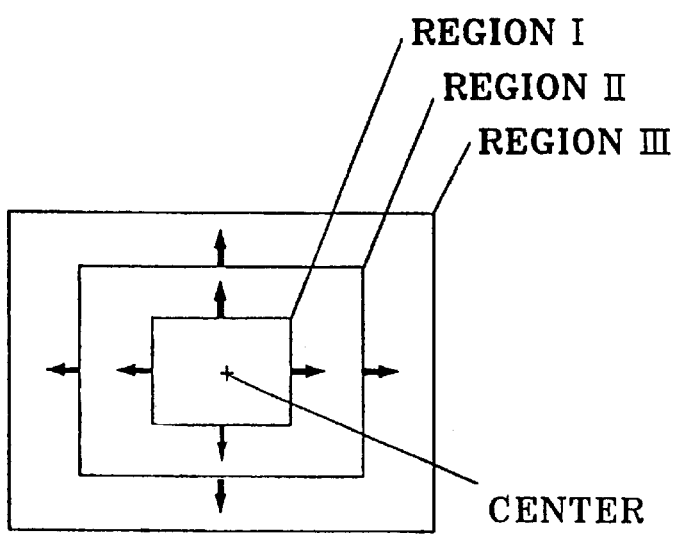
FIG. 5 shows a position at which the object is searched on the screen when the camera performs a zooming operation step by step in the direction for expanding the search region of the camera.

FIG. 5 shows relative ratios that the object occupies on the screen when the zoom/focus controller 6 controls the zoom lens step-by step in the wide direction for expanding the search region of the camera. The initial region I shows that an exemplary object, a person, is positioned to the left of the screen. Thereafter, the zoom/focus controller 6 controls the zoom lens to perform a zooming operation one more step in the wide direction, the object search region of the camera is expanded to a region II. In the region II, a ratio occupied by the object on the screen, that is, the magnitude of the object on the screen becomes small in comparison with the ratio occupied in the region I. The position of the object also moves toward the center of the screen. If the zoom/focus controller 6 controls the zoom lens to perform another zooming operation in the wide direction, the object search region of the camera is expanded to a region III. In the region III, the magnitude of the object on the screen becomes smaller still when compared with the magnitude of the object in regions I and II. The position of the object moves further toward the center of the screen from the left thereof. As shown in FIG. 5, the zoom focus controller 6 checks the position of the object on the screen to thereby adjust the zoom lens one step by one step in the wide direction, until the object approaches the center of the screen.

Figure 6:
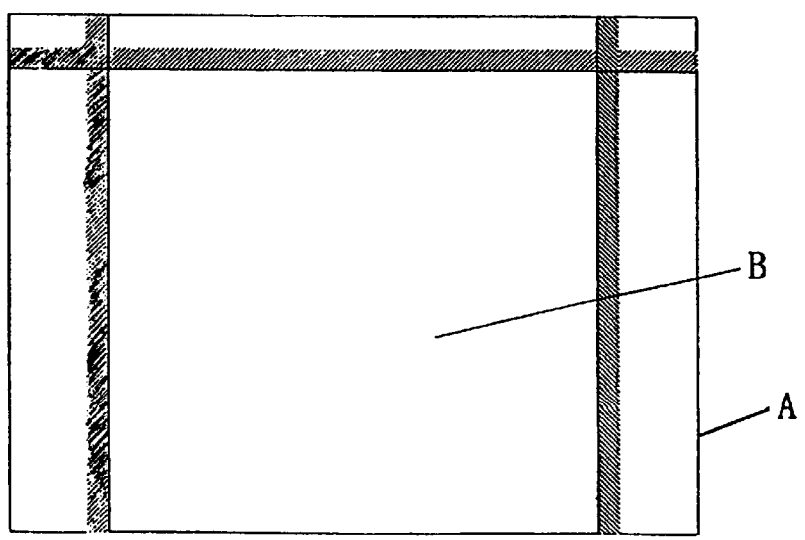
FIG. 6 shows an effective region set in the preferred embodiment of the present invention.

In this case, since the zoom/focus controller 6 judges whether the object approaches the center of the screen, a predetermined effective region is defined. Thus, it is judged whether the object is included in the effective region. If the object is not included in the effective region, the process returns to step 371a, and zooming is continuously performed, as long as the last zooming step is not reached, until the object is included in the effective region (step 371d). The effective region includes the region where the screen object actually exists. The magnitude of the effective region should be set to be equal to or smaller than the size of the screen. FIG. 6 illustrates an example of an effective region. A portion on the screen A excluding one block in the left and right and one upper block is set as an effective region B. One block can be constituted by 8×8 pixels. The FIG. 6 embodiment of an effective region can be applied to a video telephone or a video conferencing system where variations of the object are small and distance travelled by the object is relatively small. In these exemplary applications, the object is the upper half of the body or full body. Therefore, it is preferable that the effective region is set as the a portion excluding the left and right ends and a part of the upper end of the screen. The effective region can be established according to the field of application in which the apparatus is to be used.

If the object is included in the predetermined effective region in step 371d, the zoom/focus controller 6 judges that the camera 1 has tracked the object correctly. Zooming ceases and the pan motion carrier 11 is rotated one step in a direction opposite to the previous rotational direction. For example, when the left-end limit has been reached, the camera is rotated a step to the right direction (step 371e). The rotation in the opposite direction prevents the position sensor from being activated continuously. At the same time, the zoom/focus controller 6 adjusts the AF lens using the maximum value of the luminance component in the received video signal. Processing then proceeds to the step 373 (to be described below) to check whether one of the vertical limit position sensors 18 and 19 is operating indicating that the camera has reached a vertical limit position.

Meanwhile, if the PLE sensor 13 does not operate to detect that a left rotational limit has been reached, the zoom/focus controller 6 checks whether the PRE sensor 14 installed at the right-rotational limit position of the pan motion carrier 11 (step 372) is operative. The PRE sensor is activated if the pan motion carrier 11, which rotates the camera in the horizontal direction, rotates to the right-rotational limit position. When the PRE sensor 14 is detected, the zoom/focus controller 6 performs the steps 372a through 372e shown in FIG. 3B. The steps 372a through 372d perform the same functions as those of the steps 371a through 371d. In step 372e, the motor is driven one step to the left. The zoom/focus controller 6 performs a zooming operation if the object is beyond the right-rotational range of the camera. As a result, the object search region of the camera is expanded to the predetermined effective region to thereby track the moving object. If the object is properly tracked, the process proceeds to the step 373 (to be described later) to check whether the object is beyond the upper limit of the vertical rotational range.

If the sensor is not detected in the step 372 following step 371, the object exists in the horizontal camera search range. The zoom/focus controller 6 checks whether the vertical limit position sensors 18 and 19 are operated as shown in FIG. 3C to detect whether a vertical-rotation limit has been reached.

Referring to FIG. 3C, the zoom/focus controller 6 checks whether the TUE sensor 18 is operative in order to sense whether the limit of the upper rotational range of the tilt motion carrier 15 has been reached (step 373). If not, the zoom/focus controller 6 checks whether the TLE sensor 19 is operative in order to detect whether the limit of the lower rotational range (step 374) has been reached. If the TUE sensor 18 or the TLE sensor 19 is activated, the camera 1 has rotated to the limit of the upper or lower rotational range in the vertical direction, and thus cannot track the moving object. When one of the vertical limits have been reached, the zoom/focus controller 6 performs the steps 373a through 373e when the upper limit has been reached or steps 374a through 374e when the lower limit has been reached as shown in FIG. 3C. The zoom/focus controller controls the camera 1 to perform a zooming operation as long as the last zooming step is not reached, until the object is included in the predetermined effective region. (Steps 373a–373d or Steps 374a–374d.) The same functions are performed in the steps 373a through 373d or steps 374a through 374d as those of the steps 371a through 371d. When the uppermost limit has been reached, step 373e drives the vertical tilt carrier one step in the lowering direction. When the lowermost limit has been reached, step 374e drives the vertical tilt carrier one step in the upward direction. The zoom/focus controller 6 controls the program to return to the step 340, detecting subsequent frames for motion when the step 373e or 374e is completed.

Meanwhile, if none of the sensors 13, 14, 18 and 19 are activated because none of the limits of the horizontal left and right rotational range and the vertical upper and lower rotational range have been reached, the zoom focus controller 6 compares whether a region ratio (to be described below) is smaller than a predetermined value (step 375). When none of the sensors is detected, this means that the object exists in the search region of the camera. The step 375 prevents the object from being reduced excessively within the search region. The region ratio corresponds to a ratio of the region occupied by the object in the effective region with respect to the size of the effective region. A predetermined value sets a preferred ratio occupied by the object in the effective region.

If the region ratio in step 375 is smaller than the predetermined value, this means that the object has been excessively reduced.

If the region ratio is not less than the predetermined value, this means that the object is included in the effective region and has at least a minimum desired size for searching by the camera 1. Accordingly, the zoom/focus controller 6 returns to the step 340 and controls the camera 1 to detect a subsequent image frame of the object to begin determining a motion vector for the object.

Meanwhile, if the region ratio is smaller than the predetermined value, and the object size is reduced excessively compared to the size of the effective region, the zoom focus controller 6 controls the zoom lens to perform a zooming operation one step in the telephoto direction to enlarge the image of the object one step (step 376). The steps 375 and 376 are repeatedly performed until the region ratio becomes not less than the predetermined value. When the zoom lens is adjusted in the telephoto direction, the ratio occupied by the object in the screen is enlarged and the search region of the camera is reduced.

In the operational flow-charts of FIGS. 3B and 3C, the steps 371 and 372 for checking if the camera 1 has reached the limit of the horizontal rotational range, and the steps 373 and 374 for checking if the camera 1 has reached the limit of the vertical rotational range can be reversed in their operational sequence. In other words, in the embodiment illustrated by FIGS. 3A through 3C, the horizontal limit position sensors 13 and 14 are first checked and then the vertical limit position sensors 18 and 19 are checked. However, the vertical limit position sensors 18 and 19 may be checked first, and then the horizontal limit position sensors 13 and 14 may be checked subsequently. Also, the operational sequences for checking the horizontal left and right limit position sensors and the vertical upper and lower limit position sensors can be reversed from that shown. However, the steps 375 and 376 should be performed after it is determined that none of the rotational limits have been reached to prevent the object size from being reduced too much.

The apparatus according to the present invention detects a motion vector of an object between two sequential image frames within the limit of the horizontal and vertical rotational ranges of the camera and controls the camera to move in the direction and degree in correspondence to the detected motion. The apparatus adjusts the zoom lens to perform a zooming operation whenever the object is beyond the limit of the rotational range of the camera, to thereby enlarge the object search region of the camera compared to the prior art. Thus, the present invention provides effective automatic tracking of an object even when the object moves out of the ranges in which the camera can be panned and tilted.

While only a preferred embodiment of the invention has been specifically described herein, it will be apparent that numerous modifications may be made thereto without departing from the spirit and scope of the invention.

What is claimed is:

1. An apparatus for automatically tracking a moving object, the automatic tracking apparatus comprising:
    a camera including a zoom lens and an automatic focus lens, for converting an image of the object input through the lenses into electrical signals;
    camera support means including: a camera driver on which the camera is mounted, said camera driver rotating the camera around a first axis between first and second rotation limits and a second axis between third and fourth rotation limits, said second axis being perpendicular to the first axis; and a rotation limit detector for detecting whether the camera reaches any of said first through fourth rotation limits and outputting a detection signal when one of said first through fourth rotation limits is reached by the camera;
    a first controller for comparing a current unit image output from the camera with a previous unit image, detecting a motion vector of the object, and controlling said camera driver so that the camera moves in a direction and degree corresponding to the motion vector; and
    a second controller for adjusting the zoom lens in a direction for expanding an object search region of the camera whenever the camera reaches one of said first-through fourth rotation limits, thereby allowing the camera to track the moving object, and adjusting the automatic focusing lens using a luminance component of the image received in the camera,
    wherein said camera support means comprises:
    a base;
    said camera driver including a first motion carrier mounted on said base and connected to a first motor via a first shaft, for rotating said camera in the horizontal direction as the first motor rotates, and a second motion carrier mounted on said first motion carrier and connected to a second motor via a second shaft distinguished from said first shaft, for rotating said camera in the vertical direction as the second motor rotates; and
    said rotation limit detector including said first and second motion carriers, each having a hole formed therein, a position sensor provided at each of the first and the second rotation limit positions of the first motion carrier and a position sensor provided at each of the third and fourth rotation limit positions of the second motion carrier for outputting a detection signal if the hole of one of the first and second motion carriers reaches the position of one of the sensors as the motion carriers rotate.

2. The apparatus according to claim 1, wherein said second controller continuously performs a zooming operation in the direction of expanding the object search region of the camera until the object is included in a predetermined effective region.

3. The apparatus according to claim 2, wherein said predetermined effective region is a region for determining whether the object approaches the center of a screen of the camera.

4. The apparatus according to claim 3, wherein said effective region is set at a proper configuration in advance according to a use to which the apparatus for automatically tracking the moving object is to be applied, in which the set configuration is set equal to or smaller than the camera screen.

5. The apparatus according to claim 2, wherein said second controller judges that the object is beyond the object search region of the camera when the object is not included in the predetermined effective region and the zoom lens reaches a zooming limit; and
    wherein the second controller initializes the camera when the object is judged to be beyond the object search region of the camera.

6. The apparatus according to claim 2, wherein said second controller performs a zooming operation in a direction that enlarges an appearance of the size of the object until the region ratio becomes greater than or equal to a predetermined value, said region ratio corresponding to an area occupied by the object with respect to the effective region, in order to prevent the appearance of the size of the object from being excessively reduced in size.

7. A method for automatically tracking a moving object for use in an apparatus including a camera having a zoom lens and an automatic focus lens, for converting an image of an object into electrical signals, a driver for rotating the camera in at least two directions which are orthogonal to each other, a detector for detecting limits of the rotational range in each direction of the camera and controllers for controlling the camera, the driver and the detector, the automatic object tracking method comprising the steps of:

(a) comparing sequential unit images of the object with each other, detecting a motion vector of the object, generating camera control signals corresponding to the detected motion vector, and controlling the camera to track the moving object; and (b) performing a zooming operation in a direction for expanding an object search region of the camera until the object is positioned within a predetermined effective region whenever it is checked that the camera reaches a limit of one of the rotational ranges of the camera, wherein said step (b) comprises:

(b1) checking whether the camera reaches a limit of the rotational range in at least one direction;

(b2) continuously performing a zooming operation in the direction of enlarging the object search region of the camera whenever the camera reaches the limit of the rotational range in at least one direction in said step (b1);

(b3) judging whether the object is included in a predetermined effective region said step (b2), continuously performing a zooming operation until the object is included in the predetermined effective region, and rotating the camera one step in the direction reverse to the previous rotational direction once the object is included in the predetermined effective region, to then stop the zooming operation; and (b4) initializing the camera if the object it is not included in the effective region and the zoom lens reaches a zooming limit.

8. The method according to claim 7, wherein if the camera does not reach a limit of the rotational ranges with respect to all directions in the result of said step (b1) and a region ratio is smaller than a predetermined value, said region ratio corresponding to a ratio of the region occupied by the object with respect to the effective region on a camera screen, a zooming operation is continuously performed in a direction of enlarging the size of the object until the region ratio is larger than the predetermined value.

9. The method according to claim 7, wherein said step (b1) judges that the camera reaches a limit of the rotational ranges in at least one direction of the camera if at least one sensor installed at positions corresponding to the limits of the rotational ranges of the camera is activated.

10. The method according to claim 7, wherein the predetermined effective region of said step (b3) is a region set to determine whether the object is positioned in a center portion of a camera screen.

* * * * *